May 28, 1968  R. R. HUSSEY  3,385,615
STEERING POST
Filed May 10, 1966
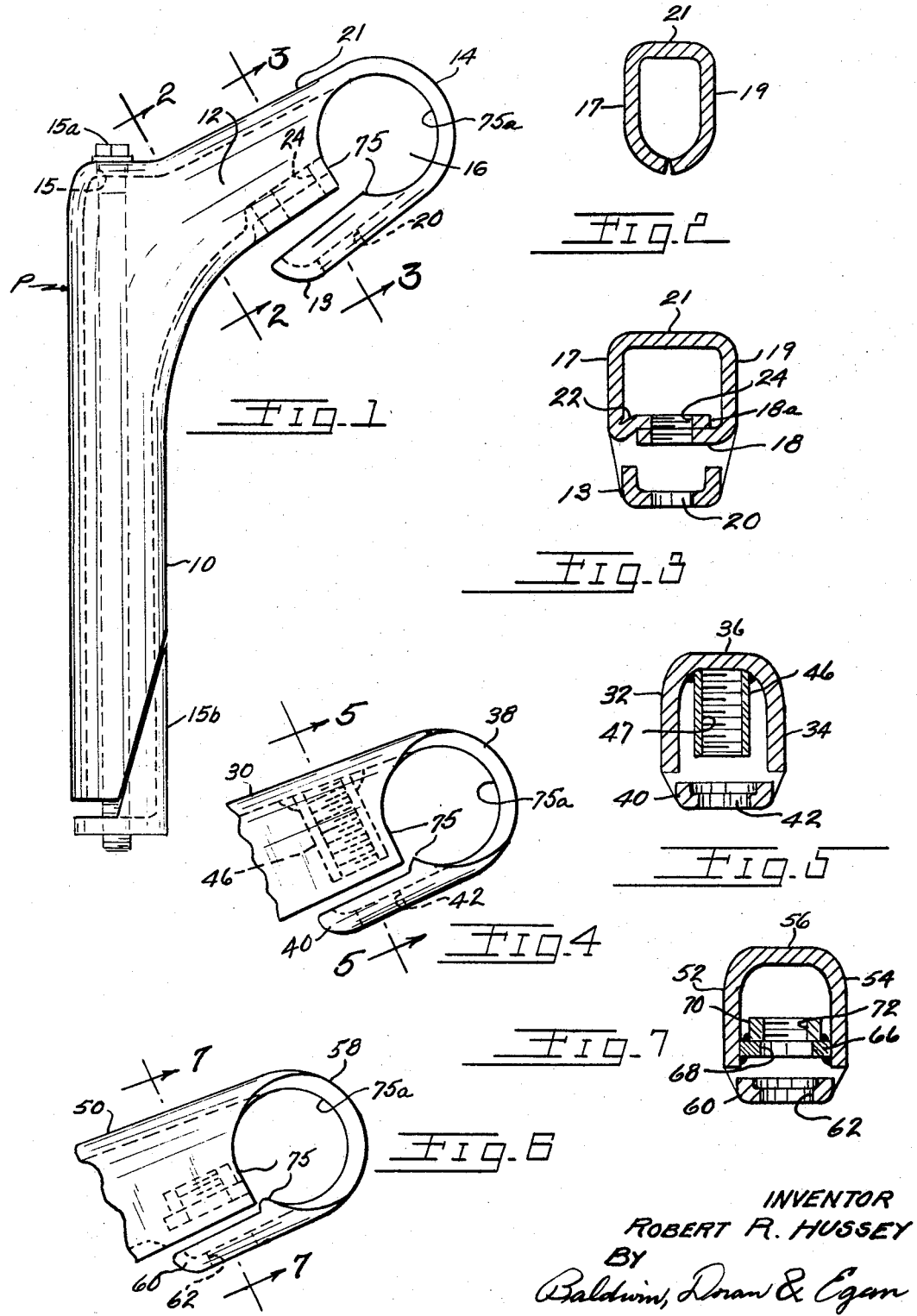
INVENTOR
ROBERT R. HUSSEY
BY
Baldwin, Doran & Egan
ATTORNEYS

United States Patent Office 3,385,615
Patented May 28, 1968

3,385,615
STEERING POST
Robert R. Hussey, Ashtabula, Ohio, assignor to The Ashtabula Bow Socket Company, Ashtabula, Ohio, a corporation of Ohio
Filed May 10, 1966, Ser. No. 549,007
4 Claims. (Cl. 287—54.1)

ABSTRACT OF THE DISCLOSURE

A cycle steering post formed of a one-piece sheet metal stamping including a hollow cylindrical stem portion adapted to be held within the forked stem of a cycle, and including a hollow neck portion formed integral with and extending outwardly from the stem portion. The neck portion has an outer free end (containing a bolt hole) bent back upon itself and spaced from the adjacent wall of the neck portion to form a cycle handle bar clamping head. Said adjacent wall of the neck portion is formed of overlapping wall portions containing a threaded aperture in line with said bolt hole for receiving a bolt (of preselected length) through the bolt hole and thence through the threaded aperture to clamp a handle bar in the clamping head. In a modification, the neck portion includes spaced side walls and a top wall. Interiorly of the neck portion is a planular plate (having an aperture) secured to the side walls and positioned parallel to the clamping head free end. A threaded nut is secured to the plate whereby a bolt of preselected length may be passed through the neck portion free end aperture, thence through the nut to clamp the handle bar.

---

This invention relates to cycle steering posts adapted for receiving cycle handle bars in clamping relation therewith and more particularly to a cycle steering post formed as a stamping and which includes a hollow cylindrical stem portion adapted to be held within an associated forked stem of the cycle, and a hollow cylindrical neck portion formed integral with the stem portion and extending upwardly and at an obtuse angle therefrom, said neck portion having an outer clamping head for receiving the cycle handle bar.

Heretofore, in cycle steering posts of this general type, as for example in the several post assemblies that are disclosed in U.S. Patents 2,487,661 and 2,505,648, the cycle bar is clamped in place by closing the clamping head through use of a fastener such as a bolt or the like which is extended through an aperture formed in the top wall of the neck portion of the post and which bolt is then projected through a corresponding aperture formed in the clamping head. A nut or similar locking element is threaded into the bolt and when tightened forces the clamping head to its closed position. As will be realized, the neck portion of the steering post is subjected to substantial stress in its normal use inasmuch as the user of the cycle oftentimes bears down upon the handle bar whereupon the neck portion of the post has a tendency to bend under said stress.

As will be further realized, with an aperture formed in the top wall of the neck portion of the post, the effective cross-section thereof is correspondingly reduced thereby likewise lowering the strength properties or capacity of said neck portion. This is a very important limitation that must be considered in the commercial utilization of such a steering post, and particularly when the steering post is intended for use on adult cycles.

It is therefore a primary object of the present invention to provide a cycle steering post having substantially increased strength over that of prior structures.

Another object of the present invention is to provide a cycle steering post of substantially increased strength and which includes a neck portion of uninterrupted cross-section whereby to afford said post with greater load carrying capacity.

A further object of the invention is to provide a cycle steering post having overlapped wall structure on the neck portion to impart strength and resistance to deformation thereto.

A further object of the invention is to provide a cycle steering post of the above type fabricated from a single sheet metal stamping.

A further object of the invention is to provide a cycle steering post of the above type that is simple in construction, inexpensive to manufacture, and highly effective in operation.

Briefly, the foregoing objects are accomplished by providing a cycle steering post formed of a one-piece sheet metal stamping and including a hollow cylindrical stem portion adapted to be held within an associated forked stem of a cycle and a hollow cylindrical neck portion formed integral with and extending upwardly from and at an obtuse angle to the stem portion. The neck portion has a free outer end bent back upon itself and spaced from the adjacent wall of the neck portion to form a handle bar clamping head having an adjustable handle bar receiving aperture therein. Such adjacent wall may be formed of overlapping wall portions to impart strength to the neck portion.

For additional strength, the bolt hole passes only partially through such neck portion. This may be accomplished by securing a nut interiorly of the neck portion, or by forming a bolt-receiving hole in the overlapped portion of the wall adjacent the free end of the clamping head.

Other objects and advantages of the invention will be apparent from the following description taken in conjunction with the drawings wherein:

FIGURE 1 is a side elevational view of a cycle steering post constructed in accordance with the invention;

FIGURE 2 is a sectional view taken along the line 2—2 of FIGURE 1;

FIGURE 3 is a sectional view taken along the line 3—3 of FIGURE 1;

FIGURE 4 is a partial side elevational view of a modified steering post clamping head;

FIGURE 5 is a sectional view taken along the lines 5—5 of FIGURE 4;

FIGURE 6 illustrates a modification of the clamping head shown in FIGURE 4; and

FIGURE 7 is a sectional view taken along the line 7—7 of FIGURE 6.

Although the invention is shown and described herein with reference to its use with cycles, it will be understood that it may be used in any application wherein one bar is to be releasably clamped at substantially right angles to another bar.

Referring to the drawings, there is shown a cycle steering post of the invention, generally designated as P, and including hollow cylindrical stem or stem portion 10 adapted to be held within an associated forked stem of a cycle, and a hollow neck or neck portion 12 formed integral with the stem 10 and extending outwardly at an obtuse angle therefrom. The neck portion 12 has an outer free end 13 bent back upon itself to form a handle bar clamping head 14 containing a handle bar receiving aperture 16. An aperture 15 is formed in the top wall of the post through which a suitable bolt 15a extends, the latter being threaded into a wedge-shaped locking element 15b. Upon threading the bolt into locking element 15b, the post stem may be securely locked in the usual manner within the cycle stem.

The neck portion 12, in cross-section, includes a side wall 17, a bottom or adjacent wall 18, a side wall 19, and a top or opposite wall 21. It will be noted in FIGURE 2 that in the portion of the neck adjacent the stem the side walls 17 and 19 are of greater length than the top wall 21 and are drawn together and closed at the bottom, as shown, to impart greater strength to the neck portion. The free end 13 is spaced from the adjacent neck portion 12 and contains a conventional bolt hole 20 having a longitudinal axis passing substantially through the longitudinal centerline of the neck portion.

The steering post P is fabricated from a one-piece sheet metal stamping formed from a single sheet metal blank of generally elongated outline. The free end 13 is formed in a cupped structure to impart strength and resistance to deformation thereto. In one form of the invention the outer portion of the bottom wall 18 is of overlapping construction, as shown in FIG. 3, for increased structural strength, such overlap including the wall 18 and its adjacent coacting wall section 18a. An inward offset 22 may be provided for further increased structural strength.

Disposed interiorly of the neck portion 12 is a bolt-receiving means in the form of a threaded aperture 24 adapted for threadedly receiving an associated bolt (not shown) through the bolt hole 20 for clamping a cycle handle bar in the clamping aperture 16 in the conventional manner. It will be noted that the offset 22 positions the bolt-receiving aperture 24 interiorly of the neck portion 12.

In the modification shown in FIGS. 4 and 5, there is shown a neck portion 30 having side walls 32 and 34 and a top wall 36. The clamping head 38 contains a free end 40 having a bolt hole 42 as in the aforementioned structure. In this instance, the bolt-receiving means takes the form of a nut 46 secured to the inner surface of the top wall 36 in line with the bolt hole 42. In the preferred form, the nut 46 is a cylindrical hollow elongated sleeve having its inner longitudinal wall or bore 47 threaded for receiving an associated bolt (through the bolt hole 42). This construction provides unusual gripping power for such nut and bolt combination and for clamping the handle bar.

Referring to FIGURES 6 and 7, the neck portion 50 contains side walls 52 and 54 and a top wall 56. The clamping head 58 contains a free end 60 having a bolt hole 62. Interiorly of the neck portion, there is positioned a planular plate 66 secured to the side walls 52 and 54 substantially parallel to the free end 60 and having an aperture 68 in line with the bolt hole 62. Disposed on the inner surface of the plate 66 in parallel relation thereto is a nut 70 having a threaded aperture 72 in line with the plate aperture 68. In operation, an associated bolt is passed through the bolt hole 62, thence through the aperture 68, and thence threadedly secured in the threaded aperture 72 to clamp the clamping head 58 about an associated handle bar.

In each of the embodiments of FIGS. 1, 4 and 6, the handle bar is tightly clamped in the clamping head substantially completely around its periphery. For this purpose in each of the post assemblies herein, the free end of the clamping head is formed with a bearing surface 75 on each side thereof which is a continuation of the circle formed by the inner wall 75a of the clamping head. In this manner when the bar is placed within the clamping head, and the latter is closed the bearing surfaces 75 and the inner wall 75a of said head cooperate to peripherally bind the said bar in place.

Thus there is provided a cycle steering post of unusual strength and resistance to deformation and containing clamping means providing optimum clamping effectiveness.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

What is claimed is:

1. A steering post for a cycle comprising, a one-piece sheet-metal stamping formed from a single sheet metal blank of generally elongated outline and including a hollow cylindrical stem portion adapted to be held within an associated forked stem of the cycle and a hollow neck portion formed integral with and extending outwardly from the stem portion, said neck portion having an outer free end bent back upon itself and spaced from the adjacent wall of the neck portion to form a handle bar clamping head, said free end containing a bolt hole having a longitudinal axis passing substantially through the longitudinal centerline of the neck portion, bolt-receiving means disposed entirely within the interior of said neck portion and adapted for receiving an associated bolt of preselected length passing through the bolt hole for clamping an associated handle bar in the clamping head, said adjacent wall being formed of overlapping wall portions to impart strength to said neck portion, and said bolt-receiving means comprising a threaded aperture formed in said adjacent wall in line with said bolt hole for threadedly receiving said bolt to clamp the associated handle bar in the clamping head.

2. The structure of claim 1 wherein said bolt-receiving means comprises a planular plate secured interiorly of the neck portion and disposed substantially parallel to said free end, said plate having an aperture therein in line with said bolt hole, and a nut secured to said plate in parallel relation thereto, said nut having a threaded aperture in line with said plate aperture and said bolt hole for receiving said bolt to clamp the associated handle bar in the clamping head.

3. The structure of claim 2 wherein the nut is secured to the inner surface of the plate.

4. The structure of claim 1 wherein said neck portion extends outwardly and upwardly from the stem portion at an obtuse angle, said outer free end being bent downwardly and back upon itself and spaced from the adjacent wall of the neck portion to form a handle bar clamping head, said free end containing a bolt hole having a longitudinal axis substantially passing through and perpendicular to the longitudinal centerline of the neck portion, said free end being cupped to impart strength and resistance to deformation thereto, said neck portion having a portion including in cross-sectional configuration a top wall and two side walls of greater length than the top wall to impart strength to the neck portion, said adjacent wall being formed of overlapping wall portions with one of the overlapping wall portions having an inward offset to strengthen the neck portion, and said bolt-receiving means is a threaded aperture formed in said overlapping wall portions for threadedly receiving said bolt to clamp the associated handle bar in the clamping head.

References Cited

UNITED STATES PATENTS

| 1,769,573 | 7/1930 | Gwinn. |
| 2,487,661 | 11/1949 | McCauley. |
| 3,059,947 | 10/1962 | Felburg et al. _____ 24—279 X |

FOREIGN PATENTS

| 1,033,883 | 4/1953 | France. |
| 803,024 | 10/1958 | Great Britain. |
| 422,520 | 6/1947 | Italy. |

CARL W. TOMLIN, *Primary Examiner.*

A. KUNDRAT, *Assistant Examiner.*